(12) United States Patent
Newson et al.

(10) Patent No.: US 6,370,183 B1
(45) Date of Patent: Apr. 9, 2002

(54) PREDICTIVE RAKE RECEIVER FOR CDMA MOBILE RADIO SYSTEMS

(75) Inventors: Paul Newson, Kanata; Frank Martin van Heeswyk, Nepean, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/178,856

(22) Filed: Oct. 26, 1998

(51) Int. Cl.[7] .............................................. H04L 27/30

(52) U.S. Cl. ........................ 375/144; 375/148; 370/320

(58) Field of Search ................................. 375/142–144, 375/148, 150, 152, 343; 370/320, 335, 342, 441, 479

(56) References Cited

U.S. PATENT DOCUMENTS

| | | | | | |
|---|---|---|---|---|---|
| 5,490,165 A | * | 2/1996 | Blankeney, II et al. | ..... | 375/205 |
| 5,673,286 A | * | 9/1997 | Lomp | ......................... | 375/208 |
| 5,903,596 A | * | 5/1999 | Nakano | ....................... | 375/208 |
| 6,058,138 A | * | 5/2000 | Fukumasa et al. | .......... | 375/208 |
| 6,208,683 B1 | * | 3/2001 | Mizuguchi et al. | ......... | 375/140 |

* cited by examiner

Primary Examiner—Stephen Chin
Assistant Examiner—Dac V. Ha
(74) Attorney, Agent, or Firm—Cobrin & Gittes

(57) ABSTRACT

A rake receiver with a finger for each of a plurality of multipath components displaced in time has provision for predicting short-term variations in the strength of each component and adapting the coefficients of each finger accordingly, thus reducing the error rate, particularly in high-data-rate applications in a time-variant environment.

36 Claims, 9 Drawing Sheets

PREDICTIVE RAKE RECEIVER FOR CDMA MOBILE RADIO SYSTEMS

FIELD OF THE INVENTION

The invention relates to "rake" receivers which have the ability to combine received signals having different transmission delays, and more particularly to rake receivers capable of predicting short-term changes in received signal strength from various transmission paths and dynamically adapting thereto.

BACKGROUND OF THE INVENTION

Code-division multiple access (CDMA) radio systems are well known.

FIG. 2 depicts portions of a conventional receiver that would typically be used to receive and demodulate the CDMA signal produced by the conventional transmitter of FIG. 1.

The receiver must generate the same long code (LC) and pseudo-noise (PN) sequences as the transmitter for demodulating the received signal. However, transmissions are generally affected by transmission delays. Thus, the receiver must determine the delay in order to determine a starting position within the LC and PN sequences for demodulating the received signal. This determination is generally performed by a "searcher". If multipath components are being received with sufficient signal strength, a typical searcher can determine the intercomponent delays.

A conventional "rake receiver", adapted from the receiver of FIG. 2, provides replicated circuity for each of the multipath components. Such a receiver is shown in FIG. 3. Where the receiver of FIG. 2 has a single digital correlator 2 (depicted in the lower half of FIG. 2), FIG. 3 includes multiple digital correlators 2, called "fingers" and numbered 2-1, 2-2, . . . 2-n. The number of fingers in a rake receiver is typically on the order of two to five.

Each finger has a delay circuit (3-1, 3-2, . . . 3-n) preceding it, and each finger's output is input to a summer 6 through a weighting circuit (5-1, 5-2, . . . 5-n).

Searcher 4 determines the transmission delay from the receiver to the transmitter. In the case of multipath transmission, it inherently determines the delay and signal strength for each of the multipath components. Information pertaining to path delay and power (collectively known as the Channel Impulse Response (CIR)) can be used to set the initial delays 3-1 etc. associated with each finger. FIG. 9 depicts an exemplary received signal comprising two multipath components 501 and 502. Component 502 arrives later (delayed by an amount connoted "delta") and with a different signal strength. Both components exhibit Rayleigh fading, well known in the art.

Searcher 4 can determine the delay "delta" amounts associated with each multipath component and accordingly provide information for configuring the delays in FIG. 3 (expressed in terms of a number of PN chip durations). In this instance, delay 3-1 would be set to zero (to handle component 502) and delay 3-2 would be set to the amount "delta" so that component 501, estimated to arrive earlier by that amount, will be delayed better to coincide with component 502.

Finger assignment module 9 receives the raw channel impulse response (CIR) estimate from searcher 4 and from it determines how best to place the fingers, i.e., what delay the fingers should be set to in order to optimize receiver Frame Error Rate performance. Finger assignment module 9 is apprised of the current state of the fingers, and assigns and deassigns fingers according to the current signal conditions as determined by the searcher in conjunction with the current state of the fingers.

FIG. 3 also shows that each finger has provision for setting the weight input to its weighting circuit 5-n. It does so according to an estimate of the Eb/No (energy per bit divided by noise, a signal-to-noise ratio) of the multipath component assigned to the finger. Conventional calculations may be used for calculating the Eb/No estimate, such as the ratio of the peak correlation value to the "noise floor" in the Fast Hadamard Transforms—see elements 209 and 210 of FIG. 2.

FIG. 4 shows the internals of the conventional finger assignment module 9. The raw CIR estimate from the searcher is received in block 901 and put through a Wiener filter. The results for each multipath component are input to a time-averaging filter (of which 902A is exemplary) in filter bank 902. Block 903 determines a power delay profile, which is a more refined estimate of the CIR in that it is a time average whereas the CIR reflects an instantaneous state.

The power delay profile produced in block 903 is passed to assignment computation algorithm 905. Block 904 keeps track of the current state of the fingers. Both are connected to finger assignment command generator 906, which generates commands issued to the fingers of the rake receiver.

Under the example of FIG. 9, two fingers would be assigned and the rest deassigned. When summer 6 combines the weighted output of finger 2-1 and the delayed, weighted output of Finger 2-2 the result will be more reliable than if just one of the multipath components were used, provided that the delays and weights are set correctly.

The conventional ways of setting the weights, based on current signal strength, do not account for short-term variations in signal strength. An improvement in performance could be attained by providing weights more dynamically responsive to short-term variations.

Accordingly, there exists a need for a receiver that can dynamically predict quality of multipath components over short time periods in a highly time-variant environment.

It is thus an object of the present invention to provide an improved CDMA receiver.

It is another object of the present invention to provide a CDMA receiver with improved error-rate performance for high-data-rate systems operating within highly time-variant environments.

It is yet another object of the present invention to provide a CDMA receiver with the ability to predict short-term variations in strength of multipath components and to compensate for those variations.

These and other objects of the invention will become apparent to those skilled in the art from the following description thereof.

SUMMARY OF THE INVENTION

These and other objects may be accomplished in a CDMA receiving apparatus having a rake receiver with several fingers, each for demodulating a multipath component of a CDMA signal, and having a searcher and finger assignment means for assigning multipath components to fingers and for initially setting finger parameters, by the present systems and methods of predicting short-term variations in strength of each multipath component, and using those predictions to assign and deassign fingers to multipath components and to initialize delays associated with those multipath components and for determining weighting of each multipath component.

An embodiment of the invention provides a rake receiver and finger assignment means for assigning multipath components to the fingers of the rake receiver. The finger assignment means includes predictors for determining power delay profile in a predictive manner from a channel impulse response determination, and assigning multipath components to fingers of the rake receiver and setting initial finger delay accordingly. In the rake receiver, a predictor is associated with each of the fingers. The predictor receives estimates of signal-to-noise ratio from its associated finger and also receives estimates of the channel fade rate, and estimates short-term fade rate of a multipath component from those data. The weight of each multipath component is set according to those estimates.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

The following describes how the invention makes predictions of short-term variations in the strength of each multipath component, and uses those predictions to configure the fingers of a rake receiver to improve performance.

Figure 1:
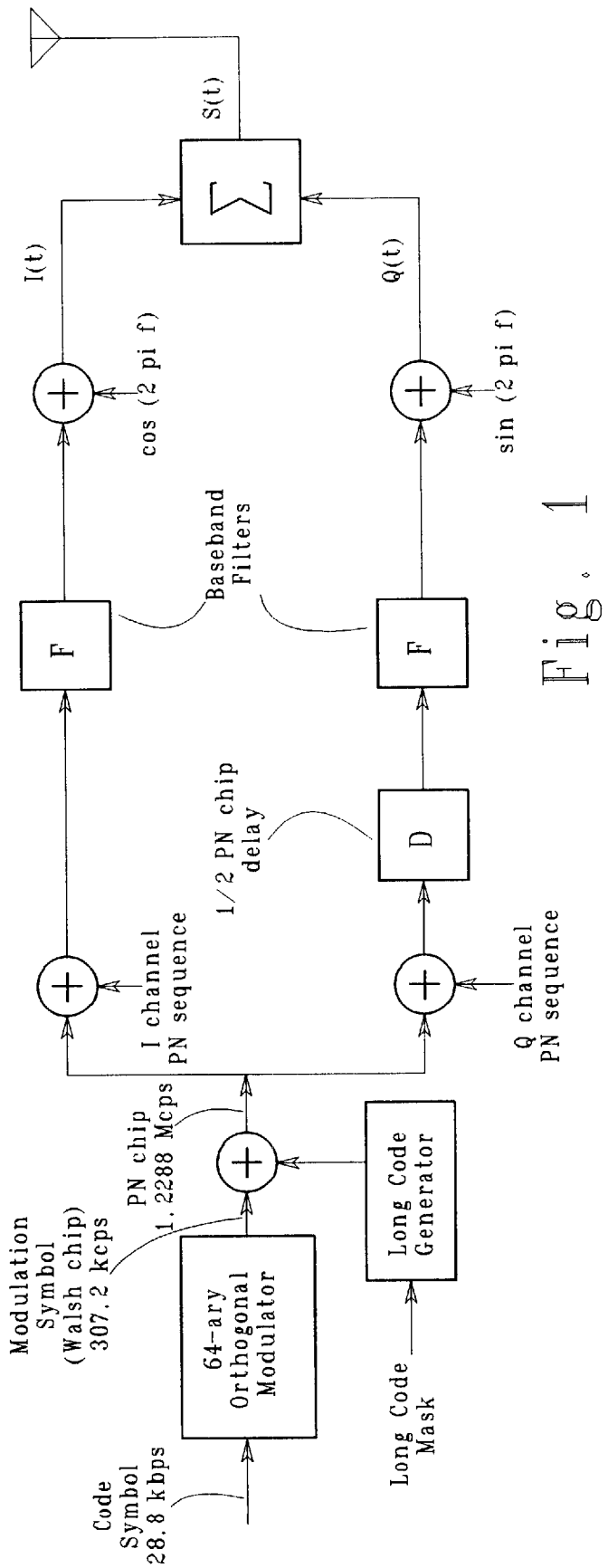
FIG. 1 illustrates a portion of a conventional IS-95 CDMA transmitter.
Figure 2:
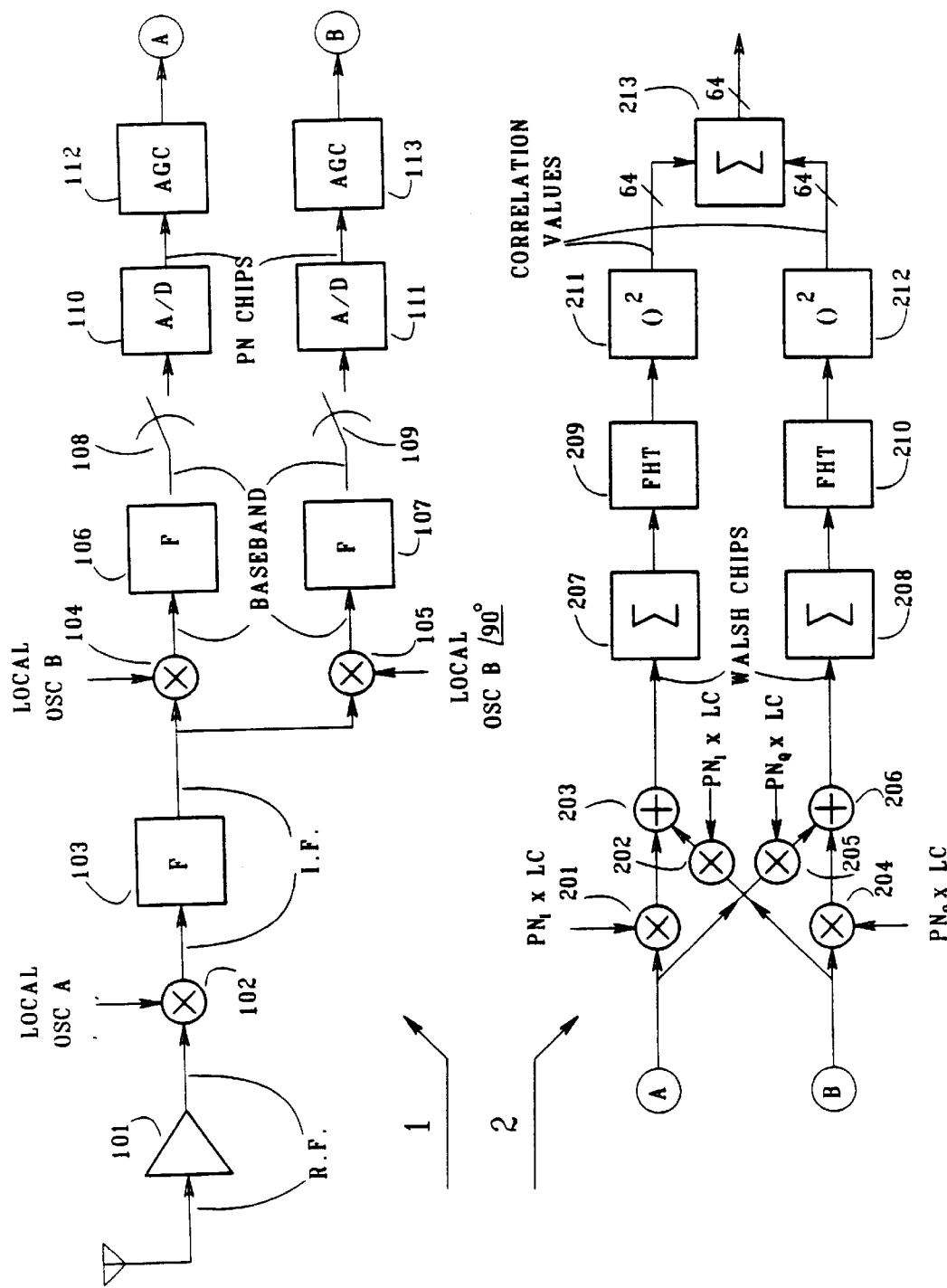
FIG. 2 illustrates a pertinent portion of a conventional CDMA receiver not equipped to handle multipath reception.
Figure 3:
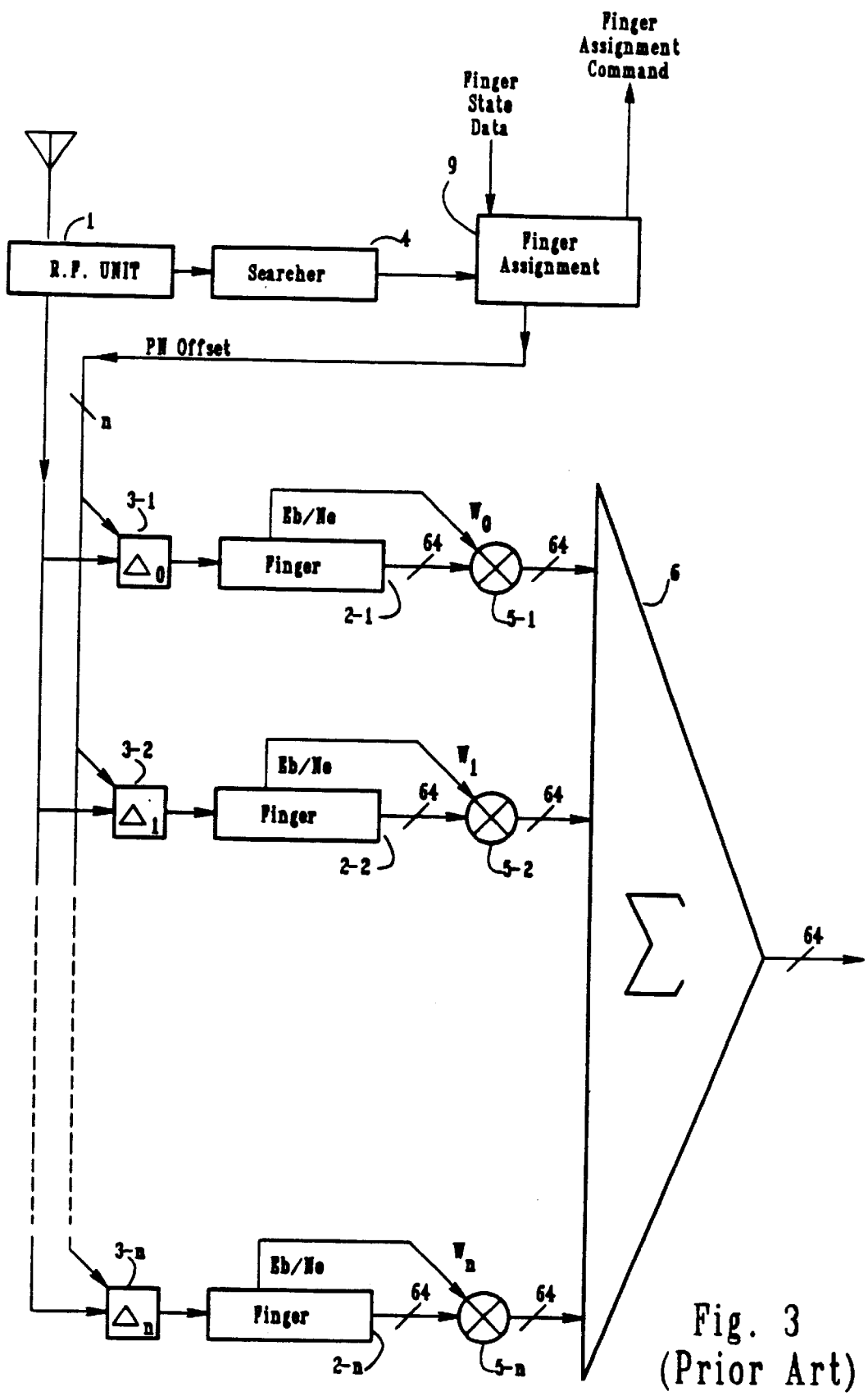
FIG. 3 illustrates a pertinent portion of a conventional CDMA "rake" receiver equipped to handle multipath reception.
Figure 5:
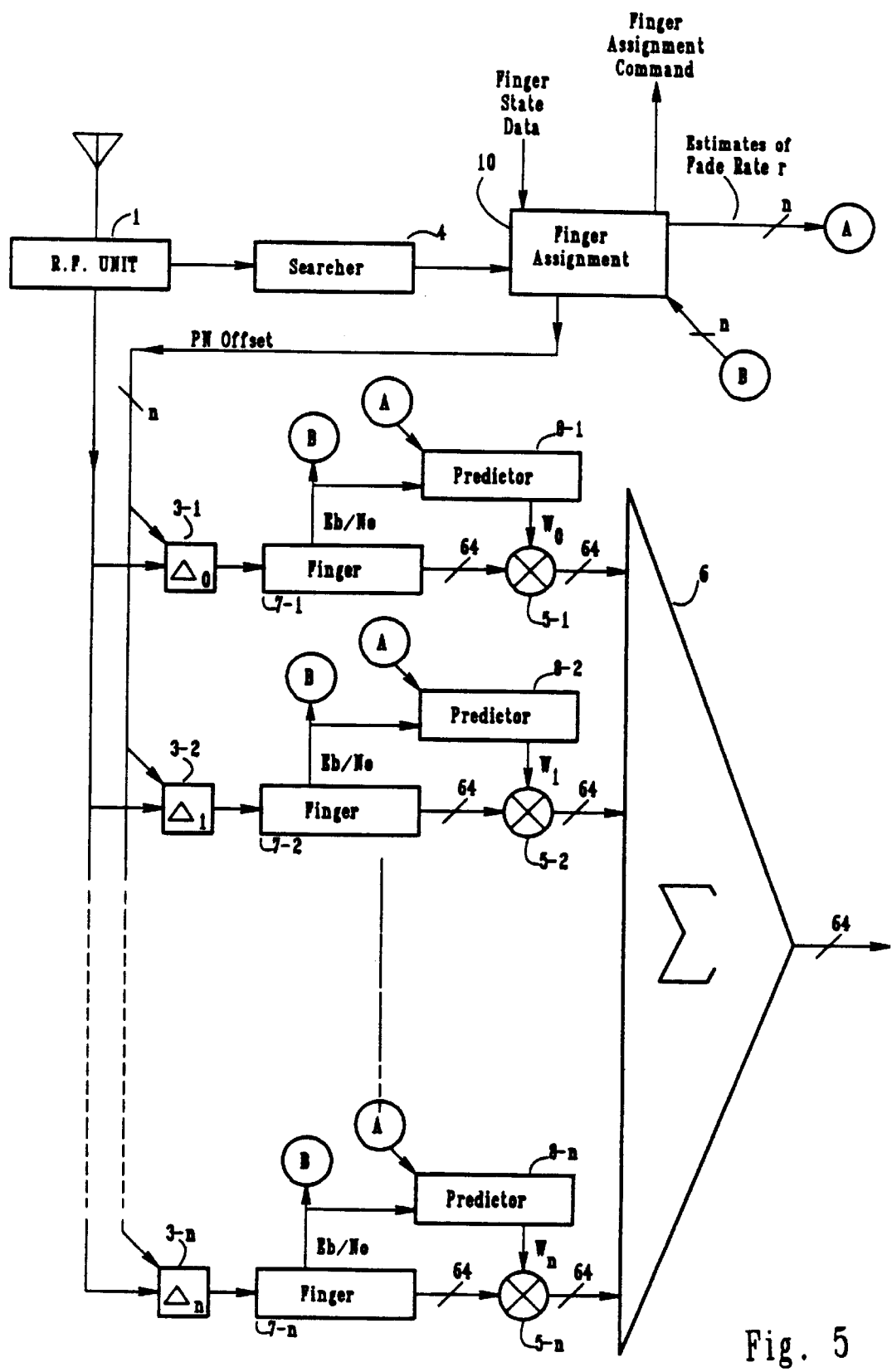
FIG. 5 illustrates a pertinent portion of the CDMA rake receiver of the present invention.

A block diagram of the pertinent portion of the receiver of the present invention is shown in FIG. 5. Fingers 2-1, 2-2, . . . 2-n of a conventional rake receiver are replaced by fingers 7-1, 7-2, . . . 7-n of the present invention. Each finger performs functions similar to those of a finger of FIG. 3, but according to the present invention set their weights through predictors 8-1, 8-2, . . . 8-n associated with each of the fingers. A predictor 8 receives the Eb/No estimate from a finger 7 and also a fade rate estimate from finger assignment module 10 and makes dynamic adjustments to the weights used by its corresponding multiplier 5.

Figure 4:
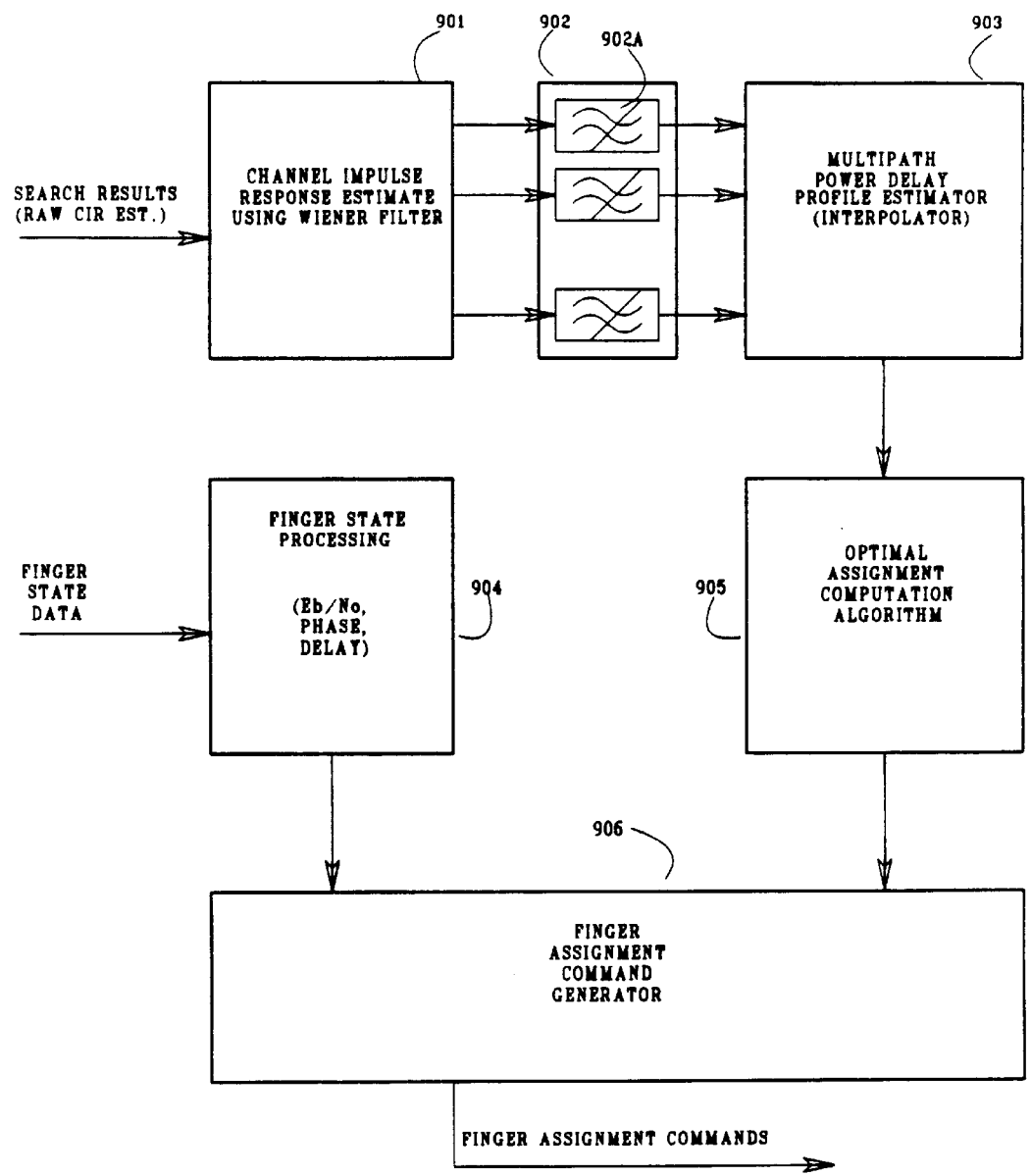
FIG. 4 shows detail of the conventional finger assignment module of FIG. 3.
Figure 6:
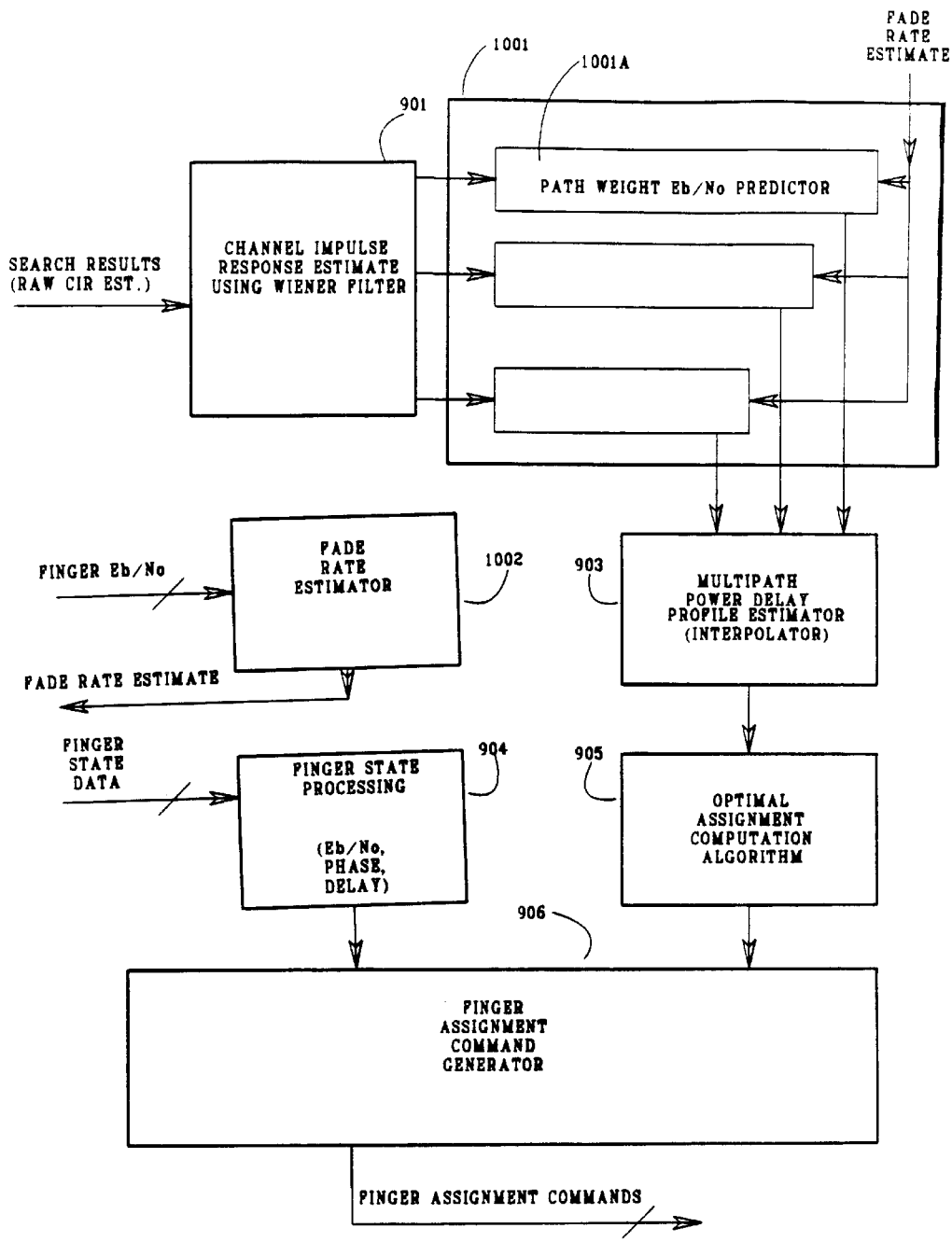
FIG. 6 shows detail of a finger assignment module of FIG. 5.

FIG. 6 depicts the internals of a finger assignment module 10 which may be used in conjunction with the present invention. Comparing it with the conventional finger assignment module 9 (depicted in FIG. 4), it is seen that some of the elements that were present in finger assignment module 9 are present as well in finger assignment module 10—namely, CIR estimator 901, power delay profiler 903, finger state processing element 904, assignment computation algorithm 905, and finger assignment command generator 906.

However, filter bank 902 of the conventional assignment module is replaced by filter bank 1001, which contains a Path-Weight-Eb/No Predictor 1001A for each multipath component for informing power delay profiler 903. The predictors 1001A function similarly to predictors 8, although the uses of the outputs of predictors 1001A and predictors 8 are different; using predictors to generate the input of multipath power delay profile estimator 903, which in turn feeds blocks 905 and 906, results in determining the assignments and deassignments and the initial delays for the fingers of the rake receiver in a manner more accurately reflecting changing conditions.

Finger assignment module 10 also includes a fade rate estimator 1002. Fade rate estimator 1002 receives the Eb/No estimates from each of the fingers 8, and produces a fade rate estimate "r" which is returned to each of the predictors 8 and which also is input to the predictors 1001A. One way of performing a fade rate estimate is by determining the number of times the signal value crosses a predetermined threshold in a given time. Other methods may of course be used without departing from the scope of the invention.

Figure 7:
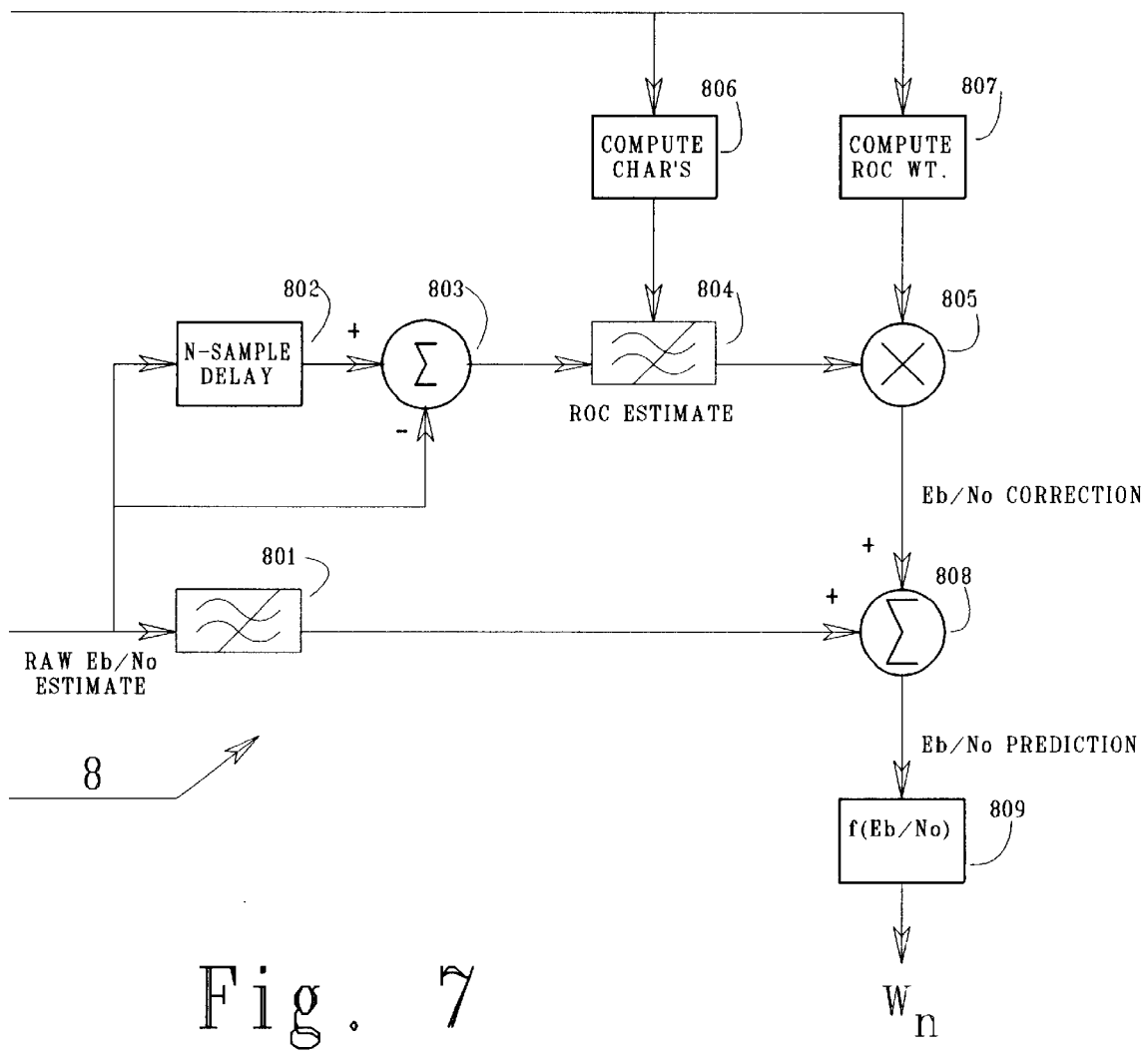
FIG. 7 depicts an embodiment of a predictor of FIG. 5.
Figure 8:
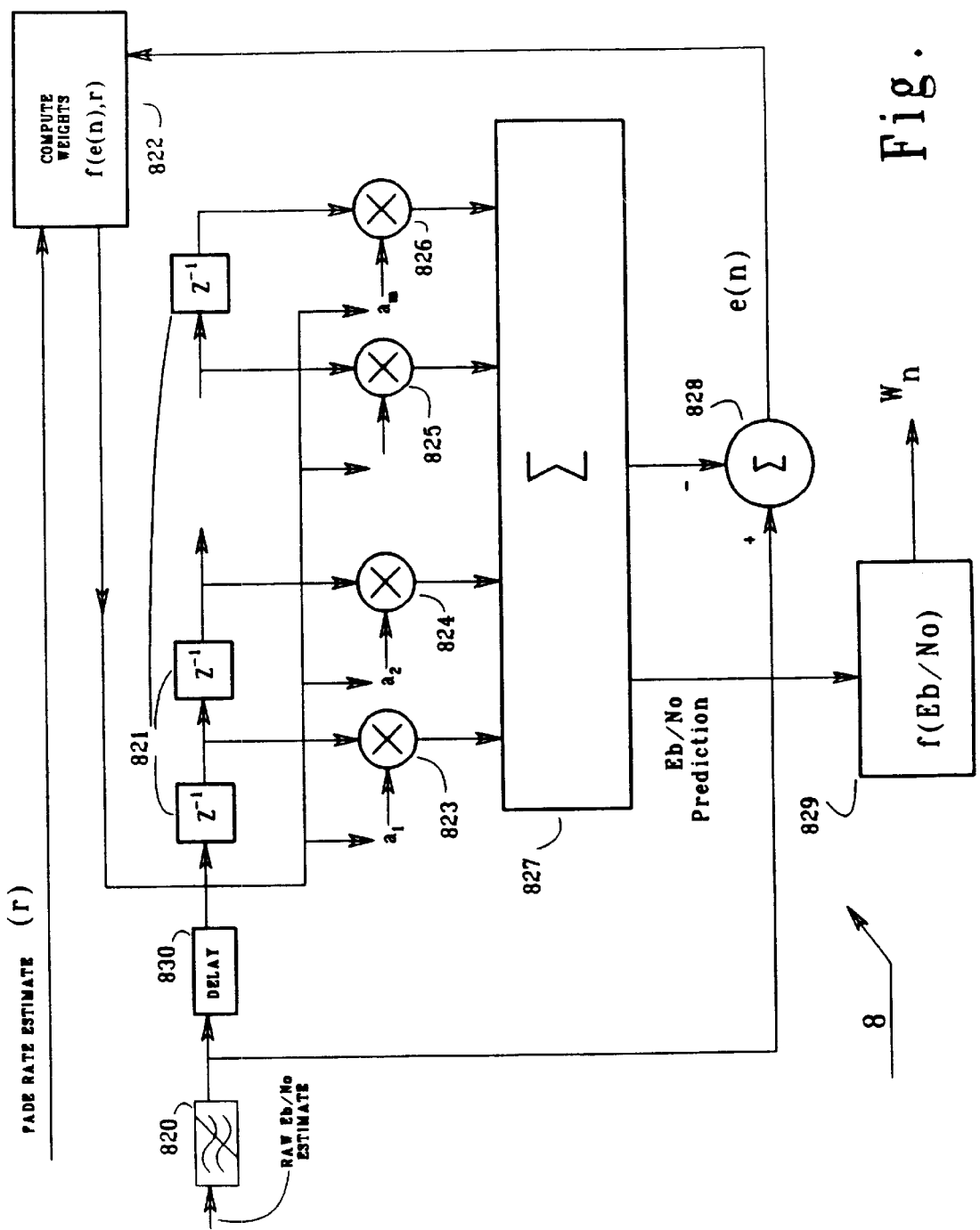
FIG. 8 depicts an alternative embodiment of a predictor of FIG. 5.
Figure 9:
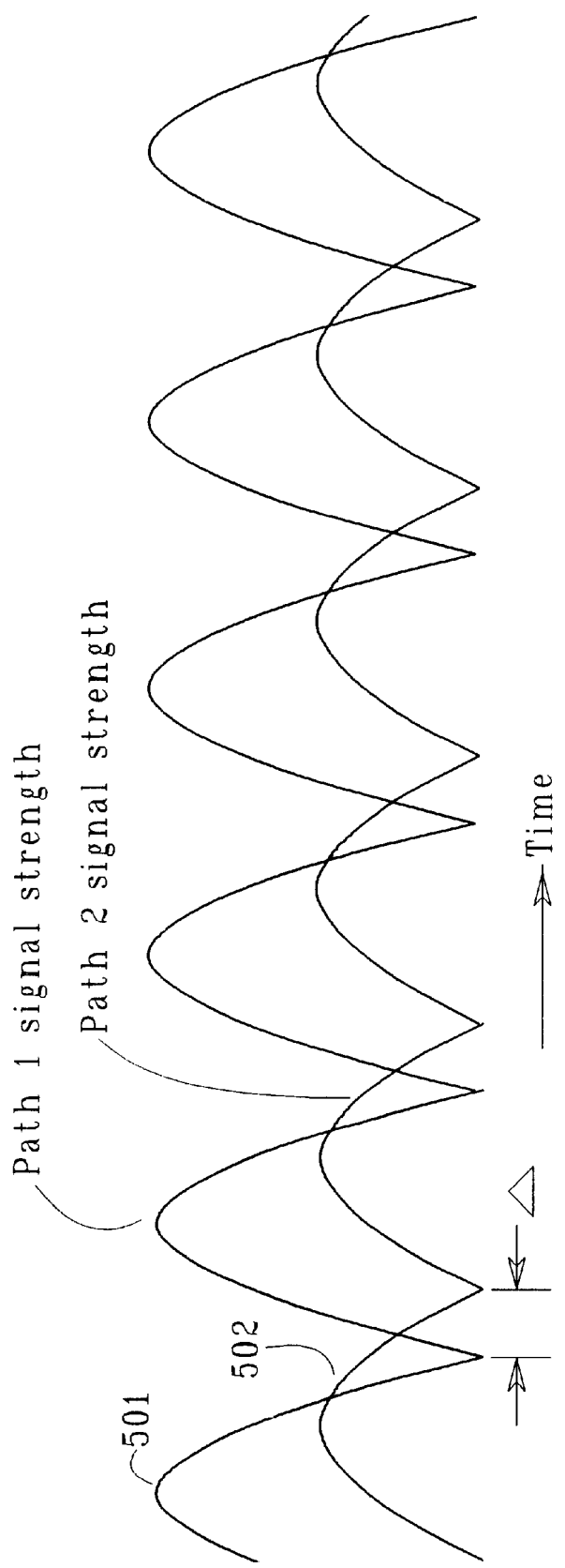
FIG. 9 shows typical received signals exhibiting multipath transmission and fading.

Two alternative embodiments of predictors 8 are depicted in FIG. 7 and FIG. 8 respectively. As noted above, these embodiments are also suitable for use as predictors 1001A.

The predictor 8 embodiment depicted in FIG. 7 performs predictive weight computation by a rate-of-change estimation method. Element 806, according to the fade estimate r, computes filter characteristics for setting up rate-of-change estimator 804. The raw Eb/No estimate from a finger 7 is subject to time-averaging filter 801, and is also input to summer 803 both directly and delayed by some number N sample times. The output of summer 803 is input to the aforesaid rate-of-change estimator 804, whose output is multiplied by multiplier 805 by the rate-of change weight (calculated based on the fade rate by rate-of-change weight estimator 807) to form an Eb/No correction.

The Eb/No correction is summed with the time averaged raw Eb/No estimate from time-averaging filter 801 to form an Eb/No prediction. Weight estimator 809 calculates the weight for the multipath component as a function of Eb/No prediction (such as by simply squaring the prediction).

The weight thus calculated from the refined Eb/No prediction may be more accurate than the conventional weight calculated as a function of the raw Eb/No estimate.

The alternative embodiment of predictor 8 depicted in FIG. 8 employs a linear predictive filter comprising shift stages 821, multipliers 823–826, and summer 827 to provide the refined Eb/No prediction used to perform the predictive weight computation. Weights are computed by estimator 822 according the fade-rate estimate r and according to e(n) which is the output of summer 828, which sums the raw Eb/No estimate from finger 7 and a feedback component from summer 827.

The raw Eb/No estimate is input to filter shift stages 821 (the number of stages is a design choice) through time-averaging filter 820 and delay 830. The outputs of shift stages 821 are input to multipliers 823–826 along with the weights from estimator 822. The outputs of the multipliers 823–826 are summed by summer 827 to produce the Eb/No prediction. Weight Estimator 829 then calculates the weight comparably to weight estimator 809 of FIG. 7.

It will thus be seen that the invention efficiently attains the objects set forth above, among those made apparent from the preceding description. In particular, the invention provides calculation of weights for use in the fingers of a rake receiver and in the finger allocation algorithm according to refined predictions of signal characteristics, rather than raw estimates based on current signal characteristics. Those skilled in the art will appreciate that the configuration depicted in FIGS. 5, 6, 7, and 8 enable the use of the predictors to calculate weights more accurately than in the conventional rake receiver depicted in FIG. 4.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Improved radio receiving apparatus for receiving spread-spectrum radio signals transmitted on a radio channel, the signals including multipath components displaced in time, the apparatus comprising:
   at least one rake receiver having a plurality of fingers, each finger comprising a digital demodulator, delay means for delaying input to the digital demodulator, signal evaluation means for producing a quality estimate of signal input to the digital demodulator, and means for weighting output of the digital demodulator according to said quality estimate,
   a searcher for determining strength and transmission delay of each multipath component; and
   finger assignment means responsive to the searcher for assigning and deassigning multipath components to fingers of the rake receiver and for accordingly initializing the delay means in the fingers,
   the improvement comprising:
   prediction means in each finger of the rake receiver responsive to the signal evaluation means and for producing a prediction of signal quality for use as said quality estimate for weighting output of the digital demodulator.

2. The improvement recited in claim 1, further comprising fade-rate estimation means for estimating fade rate of the radio channel, the fade-rate estimation means being connected to the prediction means for refining the prediction.

3. The improvement recited in claim 1 wherein the prediction means predicts signal quality according to rate-of-change estimation.

4. The improvement recited in claim 1 wherein the prediction means includes linear predictive filter means.

5. The improvement recited in claim 1, further comprising second prediction means responsive to the searcher and for producing a prediction of signal quality for determining which multipath components shall be input to fingers of the rake receiver and for determining initial settings of the delay means of each finger.

6. The improvement recited in claim 5, further comprising fade-rate estimation means for estimating fade rate of the radio channel, and wherein the second prediction means is further responsive to the fade-rate estimation means.

7. The improvement recited in claim 5, further comprising a fade-rate estimator for estimating fade rate of the radio channel, and wherein the second predictor is further responsive to the fade-rate estimator.

8. Improved radio receiving apparatus for receiving spread-spectrum radio signals transmitted on a radio channel, the signals including multipath components displaced in time, the apparatus comprising:
   at least one rake receiver having a plurality of fingers, each finger comprising a digital demodulator, delay means for delaying input to the digital demodulator, signal evaluation means for producing a quality estimate of signal input to the digital demodulator, and means for weighing output of the digital demodulator according to said quality estimate,
   a searcher for determining strength and transmission delay of each multipath component; and
   finger assignment means responsive to the searcher for assigning and deassigning multipath components to fingers of the rake receiver and for accordingly initializing the delay means in the fingers,
   the improvement comprising:
   prediction means responsive to the searcher and for producing a prediction of signal quality for determining which multipath components shall be input to fingers of the rake receiver and or determining initial settings of the delay means of each finger.

9. The improvement recited in claim 8, further comprising fade-rate estimation means for estimating fade rate of the radio channel, the fade-rate estimation means being connected to the prediction means for refining the prediction.

10. The improvement recited in claim 8 wherein the prediction means predicts signal quality according to rate-of-change estimation.

11. The improvement recited in claim 8 wherein the prediction means includes linear predictive filter means.

12. The improvement recited in claim 8, further comprising second prediction means in each finger of the rake receiver responsive to the signal evaluation means and for producing a prediction of signal quality for use as said quality estimate for weighting output of the digital demodulator.

13. The improvement recited in claim 12, further comprising fade-rate estimation means for estimating fade rate of the radio channel, and wherein the second prediction means is further responsive to the fade-rate estimation means.

14. Improved radio receiving apparatus for receiving spread-spectrum radio signals transmitted on a radio channel, the signals including multipath components displaced in time, the apparatus comprising:
   at least one rake receiver having a plurality of fingers, each finger comprising a digital demodulator, delay means for delaying input to the digital demodulator, signal evaluation means for producing a quality estimate of signal input to the digital demodulator, and means for weighting output of the digital demodulator according to said quality estimate,
   a searcher for determining strength and transmission delay of each multipath component; and
   finger assignment means responsive to the searcher for assigning and deassigning multipath components to fingers of the rake receiver and for accordingly initializing the delay means in the fingers,
   the improvement comprising:
   a predictor in each finger of the rake receiver responsive to the signal evaluation means and for producing a prediction of signal quality for use as said quality estimate for weighting output of the digital demodulator.

15. The improvement recited in claim 14, further comprising a fade-rate estimator for estimating fade rate of the radio channel, the fade-rate estimation means being connected to the predictor for refining the prediction.

16. The improvement recited in claim 14 wherein the predictor predicts signal quality according to rate-of-change estimation.

17. The improvement recited in claim 14 wherein the predictor includes a linear predictive filter.

18. The improvement recited in claim 13, further comprising a second predictor responsive to the searcher and for producing a prediction of signal quality for determining which multipath components shall be input to fingers of the rake receiver and for determining initial settings of the delay means of each finger.

19. Improved radio receiving apparatus for receiving spread-spectrum radio signals transmitted on a radio channel, the signals including multipath components displaced in time, the apparatus comprising:

at least one rake receiver having a plurality of fingers, each finger comprising a digital demodulator, delay means for delaying input to the digital demodulator, signal evaluation means for producing a quality estimate of signal input to the digital demodulator, and means for weighting output of the digital demodulator according to said quality estimate, a searcher for determining strength and transmission delay of each multipath component; and finger assignment means responsive to the searcher for assigning and deassigning multipath components to fingers of the rake receiver and for accordingly initializing the delay means in the fingers, the improvement comprising:

a predictor responsive to the searcher and for producing a prediction of signal quality for determining which multipath components shall be input to fingers of the rake receiver and for determining initial settings of the delay means of each finger.

20. The improvement recited in claim 19, further comprising a fade-rate estimator for estimating fade rate of the radio channel, the fade-rate estimator being connected to the predictor for refining the prediction.

21. The improvement recited in claim 19 wherein the predictor predicts signal quality according to rate-of-change estimation.

22. The improvement recited in claim 19 wherein the predictor includes a linear predictive filter.

23. The improvement recited in claim 19, further comprising a second predictor in each finger of the rake receiver responsive to the signal evaluation means and for producing a prediction of signal quality for use as said quality estimate for weighting output of the digital demodulator.

24. The improvement recited in claim 23, further comprising a fade-rate estimator for estimating fade rate of the radio channel, and wherein the second predictor is further responsive to the fade-rate estimation means.

25. In a radio receiving apparatus for receiving spread-spectrum radio signals transmitted on a radio channel, the signals including multipath components displaced in time, the apparatus comprising:

at least one rake receiver having a plurality of fingers, each finger comprising a digital demodulator, delay means for delaying input to the digital demodulator, signal evaluation means for producing a quality estimate of signal input to the digital demodulator, and means for weighting output of the digital demodulator according to said quality estimate, a searcher for determining strength and transmission delay of each multipath component; and finger assignment means responsive to the searcher for assigning and deassigning multipath components to fingers of the rake receiver and for accordingly initializing the delay means in the fingers of the rake receiver, a method comprising:

predicting signal quality in each finger of the rake receiver responsive to the signal evaluation means and using the signal quality prediction as said quality estimate for weighting output of the digital demodulator.

26. The method recited in claim 25, further comprising estimating fade rate of the radio channel, and using the fade-rate estimate in the predicting step for refining the prediction.

27. The method recited in claim 25 wherein the predicting step predicts signal quality according to rate-of-change estimation.

28. The method recited in claim 25 wherein the predicting step is a linear predictive filter prediction.

29. The method recited in claim 25, further comprising making a second prediction of signal quality responsive to the searcher, and determining according to said second prediction which multipath components shall be input to fingers of the rake receiver and determining according to said second prediction initial settings of the delay means of each finger.

30. The method recited in claim 25, further comprising estimating fade rate of the radio channel, and wherein the making of the second prediction means is further responsive to the fade-rate estimation.

31. In a radio receiving apparatus for receiving spread-spectrum radio signals transmitted on a radio channel, the signals including multipath components displaced in time, the apparatus comprising:

at least one rake receiver having a plurality of fingers, each finger comprising a digital demodulator, delay means for delaying input to the digital demodulator, signal evaluation means for producing a quality estimate of signal input to the digital demodulator, and means for weighting output of the digital demodulator according to said quality estimate, a searcher for determining strength and transmission delay of each multipath component; and finger assignment means responsive to the searcher for assigning and deassigning multipath components to fingers of the rake receiver and for accordingly initializing the delay means in the fingers of the rake receiver, a method comprising:

making a prediction of signal quality responsive to the searcher, and determining according to said prediction which multipath components shall be input to fingers of the rake receiver and determining according to said prediction initial settings of the delay means of each finger.

32. The method recited in claim 31, further comprising estimating fade rate of the radio channel, and using the fade-rate estimate in the step of making the prediction for refining the prediction.

33. The method recited in claim 31 wherein the prediction is made according to rate-of-change estimation.

34. The method recited in claim 31 wherein the step of making a prediction is made according to a linear predictive filter.

35. The method recited in claim 31, further comprising making second prediction of signal quality in each finger of the rake receiver responsive to the signal evaluation means and using the prediction of signal quality as said quality estimate for weighting output of the digital demodulator.

36. The method recited in claim 35, further comprising estimating fade rate of the radio channel, and wherein the second prediction means is further responsive to the fade-rate estimation.

* * * * *